US011425808B2

(12) United States Patent
Wang (10) Patent No.: US 11,425,808 B2
(45) Date of Patent: Aug. 23, 2022

(54) LIGHTING APPARATUS AND SYSTEM FOR INDICATING LOCATIONS WITHIN AN AREA

(71) Applicant: WISTRON NEWEB CORPORATION, Hsinchu (TW)

(72) Inventor: Chia-Hsiang Wang, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 335 days.

(21) Appl. No.: 16/790,828

(22) Filed: Feb. 14, 2020

(65) Prior Publication Data

US 2021/0259082 A1 Aug. 19, 2021

(51) Int. Cl.
| | |
|---|---|
| *H05B 47/125* | (2020.01) |
| *G08B 5/36* | (2006.01) |
| *G08B 25/10* | (2006.01) |
| *G06T 7/20* | (2017.01) |
| *H05B 47/19* | (2020.01) |
| *H04N 5/232* | (2006.01) |
| *H04N 7/18* | (2006.01) |
| *H04W 84/18* | (2009.01) |

(52) U.S. Cl.
CPC ............ *H05B 47/125* (2020.01); *G06T 7/20* (2013.01); *G08B 5/36* (2013.01); *G08B 25/10* (2013.01); *H04N 5/23299* (2018.08); *H05B 47/19* (2020.01); *G06T 2207/10016* (2013.01); *G06T 2207/30232* (2013.01); *H04N 7/181* (2013.01); *H04W 84/18* (2013.01)

(58) Field of Classification Search
CPC .. H05B 47/125; H05B 47/19; H04N 5/23299; H04N 7/181; G06T 7/20; G06T 2207/10016; G06T 2207/30232; G08B 5/36; G08B 25/10; H04W 84/18
See application file for complete search history.

(56) References Cited

U.S. PATENT DOCUMENTS

| | | | | |
|---|---|---|---|---|
| 9,820,361 | B1 * | 11/2017 | Turvy, Jr. .............. | H04L 5/0055 |
| 2012/0299509 | A1 * | 11/2012 | Lee ..................... | H04L 61/6081 |
| | | | | 315/291 |
| 2016/0323972 | A1 * | 11/2016 | Bora ......................... | F21S 8/04 |
| 2019/0053358 | A1 * | 2/2019 | Kurihara ................ | H05B 45/20 |

* cited by examiner

*Primary Examiner* — Mirza F Alam
(74) *Attorney, Agent, or Firm* — McClure, Qualey & Rodack, LLP (57) ABSTRACT

A lighting apparatus and a system for indicating locations within an area are provided. The system includes a plurality of lighting apparatuses that are installed at different locations within the area. The lighting apparatuses form a mesh network. Every lighting apparatus is assigned with an identifier for locating the lighting apparatus with a color or a pattern. The lighting apparatus includes a control circuit that controls the lighting apparatus to operate with a first mode or a second mode. The apparatus includes a lighting unit that can be activated to illuminate color or pattern on a region for indicating where the lighting apparatus is located under the second mode. In an aspect, the area is divided into multiple regions that are indicated by different combinations of colors and patterns illuminated by the lighting units of the lighting apparatuses separately.

18 Claims, 7 Drawing Sheets

LIGHTING APPARATUS AND SYSTEM FOR INDICATING LOCATIONS WITHIN AN AREA

FIELD OF THE DISCLOSURE

The present disclosure relates to a technology for indicating locations within an area, and more particularly to using a lighting apparatus that is capable of indicating one or more locations within the area by illuminating a color or a pattern and a system thereof.

BACKGROUND OF THE DISCLOSURE

A conventional emergency lighting device is generally designed to have a backup power supply, e.g., battery, inside the device, and is used to illuminate a light during a period of power outage.

In a normal circumstance, the emergency lighting device is on a standby mode as connecting to an alternating current (AC) power source, e.g., an electrical wall outlet, for maintaining the inside battery to be fully charged. The emergency lighting device is switched to be powered by a direct current (DC) power source, i.e., the battery, for illuminating the light once a power outage state is detected.

The emergency lighting device is an important facility in a place since it takes a responsibility for illuminating emergency light in an emergency situation. For example, when a place fires, the emergency lighting device is almost the only device that still works during power outage. The emergency lighting device can assist the fire fighters to enter the fire scene and to evacuate the trapped lives.

SUMMARY OF THE DISCLOSURE

In response to the above-referenced technical inadequacies, the present disclosure provides a lighting apparatus and a system for indicating locations within an area.

In an aspect of the disclosure, the system for indicating locations within an area includes a plurality of lighting apparatuses that are installed at different locations within a specific area. The plurality of lighting apparatuses form a mesh network and each of which is assigned with an identifier for locating the lighting apparatus using a color or a pattern.

The lighting apparatus includes a control circuit that is used to operate the lighting apparatus with a first mode or a second mode. In general, the lighting apparatus is standby under the first mode, and is activated to illuminate the color or the pattern under the second mode when receiving an activation signal from a control center or a power-interruption signal.

The lighting apparatus includes a lighting unit being controlled by the control circuit, and the lighting unit includes a light source that can be activated to illuminate the color or the pattern associated with the identifier of the lighting apparatus on a region for indicating where the lighting apparatus is located under the second mode, i.e., an emergency mode. The lighting apparatus uses a memory to record the identifier. The lighting apparatus includes a communication circuit for transmitting signals generated by the control circuit or receive signals from another device over the mesh network.

In one further aspect of the disclosure, the area with the plurality of lighting apparatuses can be divided into multiple regions that are indicated by different combinations of colors and patterns illuminated by the lighting units of the plurality of lighting apparatuses separately. In an embodiment, the multiple regions include one or more regions on different floors, and the identifier of every lighting apparatus associates to a floor where the lighting apparatus is installed.

In another aspect of the disclosure, the system provides a control center that is used to receive the identifier from one of the plurality of lighting apparatuses over the mesh network under the second mode. Therefore, the control center is able to locate the lighting apparatus according to the identifier.

In yet another aspect of the disclosure, the control center can receive channel state information (CSI) and corresponding identifiers from any of the plurality of lighting apparatuses so as to perform life detection such as image motion detection, CSI breathing detection or CSI motion detection. Further, according to a detection result, the control center is able to indicate the region by the color or the pattern when querying a lookup table that records identifiers corresponding to the plurality of lighting apparatus.

In one further aspect of the disclosure, the identifier with respect to every lighting apparatuses is associated to a floor where the lighting apparatus is installed. When the lighting apparatus receives channel state information (CSI) from another lighting apparatus, the lighting apparatus performs CSI breathing detection or CSI motion detection. Alternatively, the control center receives channel state information (CSI) and corresponding identifiers from one or more lighting apparatuses that are installed at the designated locations so as to position the trapped lives as performing the CSI breathing detection or the CSI motion detection.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

The present disclosure is related to a lighting apparatus and a system for indicating locations within an area. The lighting apparatus is preferably an emergency lighting device that is configured to be disposed at a specific area and is especially ready for emergent conditions. For example, when a building suffers power outage, the light apparatus installed at a specific region can be switched to connect to batteries as a main power source for the apparatus automatically, instead of connecting to an alternate current (AC) power source in a normal state. According to the aspects of the disclosure, in addition to providing the emergency light when the power goes out, the lighting apparatus in the system is able to be functioned as an emergency facility for indicating a location within a specific area by illuminating a color or a pattern.

Further, the system for indicating locations within an area of the disclosure utilizes a plurality of lighting apparatuses that are installed at different locations within the area to accurately indicate the locations thereof by illuminating the various colors or patterns. More specifically, the plurality of lighting apparatuses of the system are assigned with different colors or patterns for the purpose of indicating the locations where they are installed. There settings can be used in a lookup table and should be stored to a specific memory or database such as the storage of a control center. The lighting apparatus and the system using the plurality of lighting apparatuses embody a more comprehensive solution for emergency evacuation.

Figure 1:
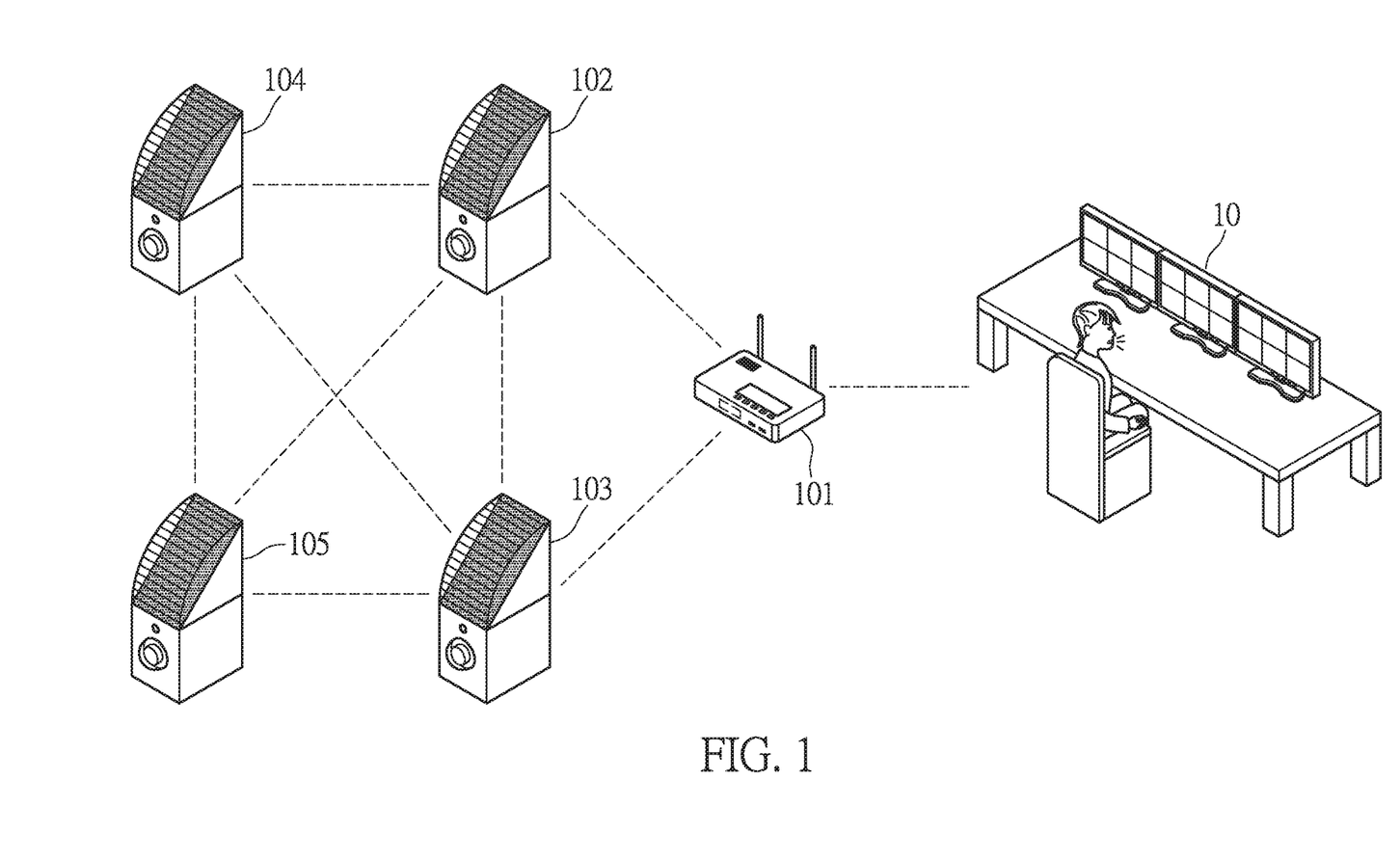
FIG. 1 is a schematic diagram depicting a network framework of a system for indicating locations within an area according to one embodiment of the disclosure.

FIG. 1 schematically shows a network framework of the system for indicating locations within an area according to one embodiment of the disclosure.

The system includes a plurality of lighting apparatuses 102, 103, 104 and 105 that are installed at various locations of a place. The lighting apparatus 102, 103, 104 and 105 can be communicated with each other via a wireless communication protocol so as to form a mesh network. The wireless communication protocol can be a mesh routing protocol that can be locally operated over the mesh network. The mesh network is a local network topology formed by a plurality of nodes that include the lighting apparatuses 102, 103, 104, 105 and some other network facilities such as a gateway device 101 or the like. Each of the lighting apparatuses is a standalone device that can operate independently, for example, the lighting apparatus generally acts as a battery-powered emergency light when the place suffers power outage.

In particular, every lighting apparatus (102, 103, 104 or 105) can also cooperate with other lighting apparatuses within the same mesh network. For example, when one of the lighting apparatuses 102, 103, 104 and 105 generates a message, the message can be transferred by other lighting apparatuses in order to transfer the message to a destination, e.g., a control center 10, through the gateway device 101.

In one embodiment of the disclosure, the plurality of lighting apparatuses 102, 103, 104 and 105 are configured to be installed at designated locations and the control center 10 records identifiers with respect to the plurality of lighting apparatuses 102, 103, 104 and 105. Therefore, the control center is able to identify the message sent by any of the apparatuses. The control center 10 can serve as an emergency center for responding to a disaster, e.g., a fire accident, appropriately since it can effectively collect instant information regarding to the locations where the disaster occurs through the plurality of lighting apparatuses 102, 103, 104 and 105.

For example, when a place loses its power due to a fire accident, a nearby lighting apparatus is activated to light and also illuminate a color or a pattern when power outage is detected. If there are lives (e.g., people or animals) trapped at the place, the lives trapped can return any message including the color or the pattern he sees to the control center 10 via their mobile device or any emergency equipment. After that, the control center 10 can identify the location where the fire accident occurs according to the identifier of the lighting apparatus corresponding to the color or the pattern.

In one further exemplary example of the disclosure, since the plurality of lighting apparatuses 102, 103, 104 and 105 are wirelessly communicated with each other over the mesh network, channel state information (CSI) can be transferred among the apparatuses via a wireless communication protocol. In one aspect, CSI can be used to acknowledge the channel properties of the communication links. CSI is referred to as a reference to acknowledge how a signal propagates among the apparatuses 102, 103, 104 and 105. Therefore, the control center 10 can use the information of CSI to conduct disaster relief when it receives CSI and corresponding identifiers from one or more of the plurality of lighting apparatuses 102, 103, 104 and 105. For example, the control center 10 or any of the lighting apparatuses 102, 103, 104 and 105 can perform CSI breathing detection or CSI motion detection. It should be noted that the CSI breathing detection is a technology that uses CSI signals to recognize the number of breaths of the trapped lives who carries a device generating the wireless signals by analyzing the amplitudes of sub-carriers of CSI; and the CSI motion detection is a technology for identifying the motion of the trapped lives who carries the device generating the wireless signals by analyzing propagation of the wireless signals. In an aspect, once any abnormal event occurs e.g., based on the result of the image motion detection, the CSI breathing detection or CSI motion detection, is determined to indicate that lives to be trapped at the place are found, the corresponding lighting apparatus may immediately send its identifier to the control center. After that, when any detection result indicates that there is any life to be trapped at the place, the control center can immediately locate the trapped lives according to the identifier.

Figure 2:
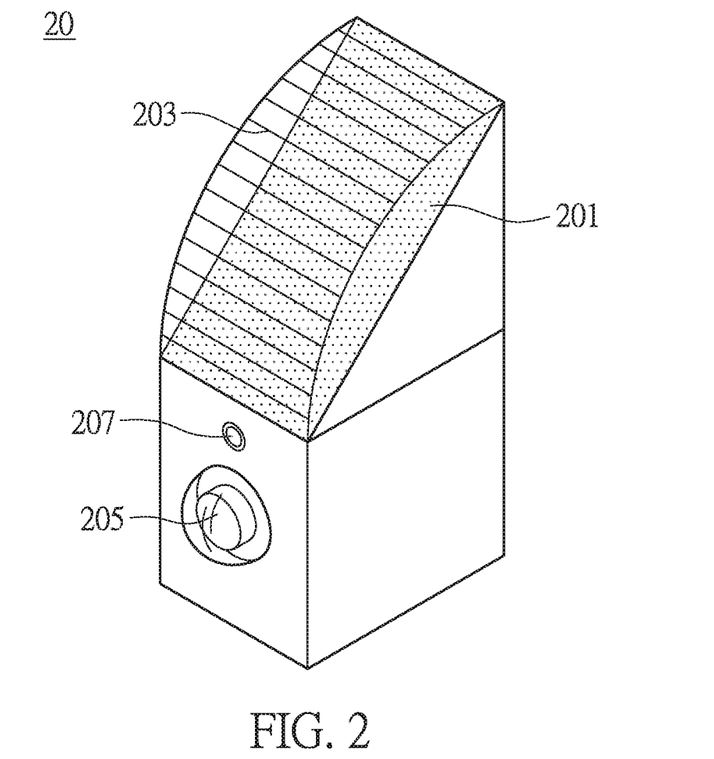
FIG. 2 is a schematic diagram depicting main components of a lighting apparatus in one embodiment of the disclosure.

FIG. 2 is a schematic diagram depicting main components of a lighting apparatus in one embodiment of the disclosure.

A lighting apparatus 20 is shown in the diagram. The lighting apparatus 20 includes an emergency lighting source 205 that is used to light the place where the lighting apparatus 20 is installed in order to light up the place encountering power outage.

The lighting apparatus 20 also includes a lighting source 201 that can illuminate a specific color and/or a pattern through a condenser 203. It should be noted that the color illuminated by the light source can be generated by a color filter or a color light-emitting element. The condenser 203 can also act as the color filter or the color light-emitting element. For illuminating the patter, a mask with a mask pattern can be used on the light source so as to form the pattern. The condenser 203 can be used as the mask in one aspect.

In an exemplary example, through the condenser 203, the light illuminated by the lighting source 201 can be projected onto a ceiling and the nearby lives can recognize the color and/or the pattern and return the color and/or the pattern to the control center. The control center can identify the location where the lives are trapped when querying a lookup table that records identifier corresponding to the lighting apparatus 20.

The lighting apparatus 20 includes a camera unit 207. For example, the camera unit 207 is controlled by a control circuit of the lighting apparatus 20 for capturing a series of images of a zone covering the region being indicated by the color or the pattern. After that, when the control center or any device receives the series of images of the zone, an image motion detection can be performed using the series of images so as to determine if any trapped life stays in the zone. The control center can also locate the trapped life according to the identifier of the lighting apparatus 20 which generates the images when it is determined that one or more lives are in the zone.

Furthermore, the camera unit 207 is designed to be rotatable through a specific mechanism for adjusting an angle of view of the camera. The camera unit 207 can be controlled by the control center for capturing the images over a surveillance zone. The lighting apparatus 20 with the camera unit 207 can therefore be used to monitor a disaster site by collecting images of the site.

It should be noted that an area which is equipped with the system is divided into multiple regions and every region has at least one lighting apparatus. The colors or the patterns illuminated by the lighting apparatuses over the area may not conflict with each other. It is beneficial for the control center to identify the locations through the diverse colors and pattern, e.g., characters, symbols or numerals.

Figure 3:
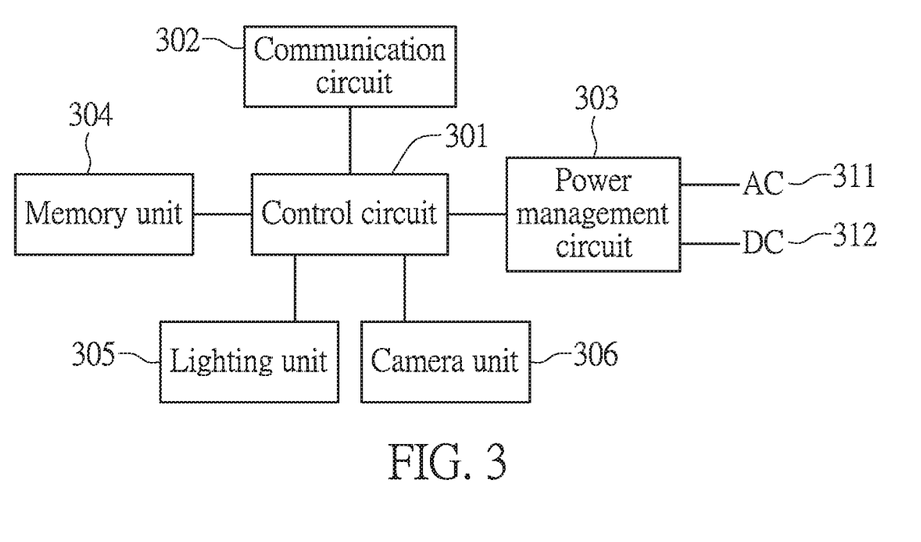
FIG. 3 is a block diagram depicting circuit components of the lighting apparatus in one embodiment of the disclosure.

FIG. 3 is a block diagram depicting circuit components of the lighting apparatus in one embodiment of the disclosure.

One of the main components of a lighting apparatus is a control circuit 301. The control circuit 301 is used to operate the lighting apparatus with a first mode or a second mode. The first mode exemplarily indicates a normal mode that the lighting apparatus is continuously charged by connecting to an alternate current power source (AC 311). The second mode exemplarily indicates an emergency mode that the lighting apparatus is switched to be power by a direct current power source (DC 312) due to the AC power is outage. For example, the lighting apparatus is standby under the first mode, and it is activated to illuminate the color or the pattern under the second mode when receiving an activation signal from a control center or a power-interruption signal generated by a power management circuit 303.

The power management circuit 303 of the lighting apparatus is electrically connected with the control circuit 301 and also linked to both the AC 311 and the DC 312 that are ready for the lighting apparatus under the first mode or the second mode. When the place where the lighting apparatus is installed suffers a power outage, the power management circuit 303 generates the power-interruption signal to the control circuit 301 due to the AC 311 is gone. The power-interruption signal makes the control circuit 301 to switch to the DC 312 automatically. Further, the lighting apparatus can also be activated to the second mode by a remote control, i.e. the control center.

In addition to a light source is used to light up the region under the second mode, the lighting apparatus includes a lighting unit 305 that is controlled by the control circuit 301 to illuminate the color or the pattern. The lighting unit 305 indicates a device that integrates a light source and other optical components. The lighting unit 305 can be activated to illuminate the color or the pattern associated with the identifier of the lighting apparatus on a region for indicating where the lighting apparatus is located under the second mode.

It should be noted that the lighting source 201 of FIG. 2 and the emergency lighting source 205 of FIG. 2 are two different light sources respective to different functions. Based on the description of the above embodiment, the lighting unit 305 of the lighting apparatus can integrate the two kinds of lighting sources, in which one of the lighting sources is to illuminate the color or the pattern for identifying the location and the other is to emit the emergency light for illuminating the surveillance zone.

The lighting apparatus includes a communication circuit 302 used to establish communication channel with other lighting apparatuses over the mesh network and especially supporting a specific wireless communication protocol such as WiFi™, Bluetooth™, BLE, Zigbee or the like. The communication circuit 302 is controlled by the control circuit 301 in order to convert signals generated by the control circuit 301 to a specific format of a communication protocol. The signals are transmitted by the communication circuit 302. The communication circuit 302 also receives the signals from another device over the mesh network.

The lighting apparatus has a memory unit 304 that can be a main memory of the lighting apparatus and can also be a memory circuit for storing data. For example, the memory circuit stores an identifier that is used to locate the light apparatus with the color and/or the pattern. In one embodiment, the identifier may be an encoded data which can be used to identify the color or the pattern. For example, the identifier is a serial number '01000', in which the first two digits are associated with different colors and the next three digits are associated with different patterns. In another embodiment, the encoded data may further include floor information with additional digits. Further, the data stored in the memory unit 304 includes the signals received from other lighting apparatuses over the mesh network.

The lighting apparatus includes a camera unit 306 that primarily integrates a photosensitive element, a lens, a memory for buffering the images, and a rotary mechanism. The rotary mechanism allows the camera unit 306 to be controlled by the control circuit 301 for taking images in a specific direction by adjusting its angle of view. For example, the images captured by the camera unit 306 can be used to perform image motion detection by scanning the region through images. Once the trapped lives are detected, the camera unit 306 of the lighting apparatus can be controlled to capture the images of the lives.

Further, the images taken by the camera unit 306 may also reveal the color or the pattern illuminated by the lighting unit 305. The control center can identify the location when receiving the images with the information of the color or the pattern by checking the color or the pattern in the images and querying a lookup table that records the identifier corresponding to the lighting apparatus.

It should be noted that the color and/or the pattern illuminated by the lighting apparatus is recorded with an identifier of the lighting apparatus in the control center. In an exemplary example of the disclosure, an area which is equipped with the system is divided into multiple regions that are indicated by different combinations of colors and patterns illuminated by the lighting apparatuses separately. The multiple regions include one or more regions on different floors.

Figure 4:
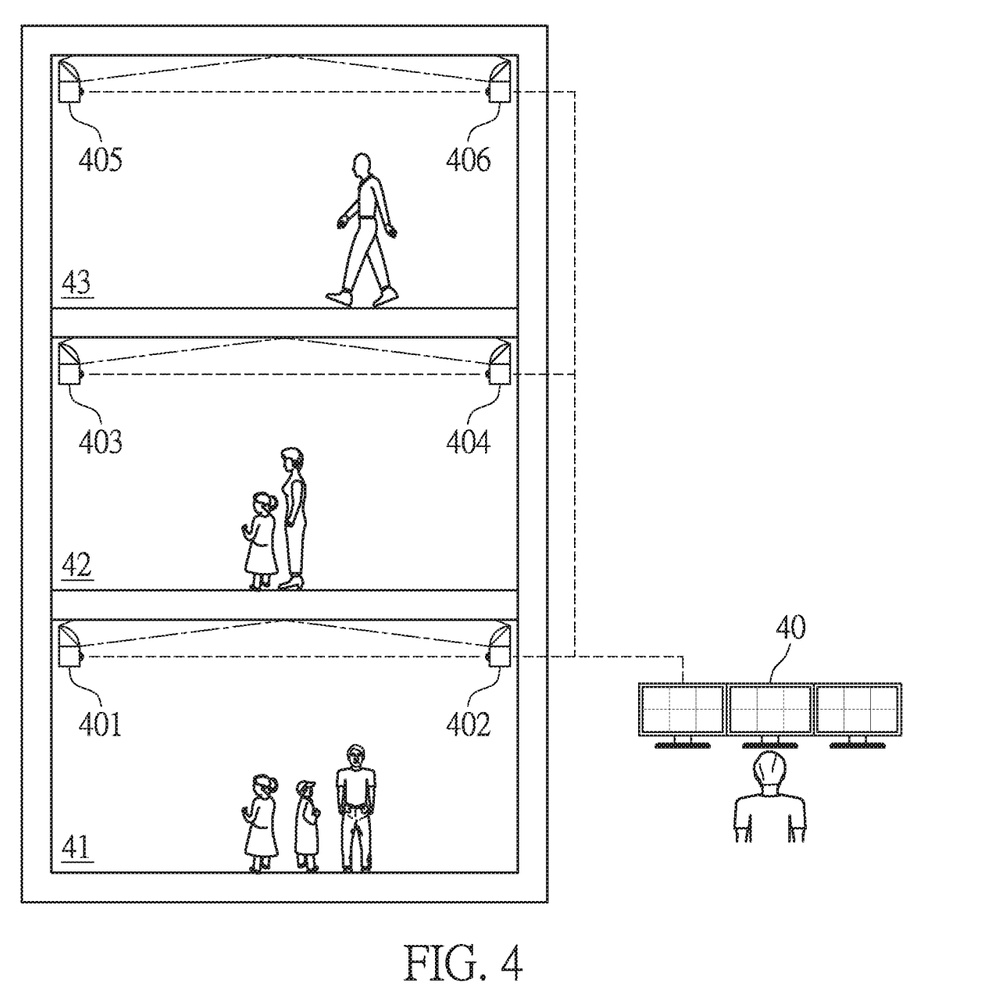
FIG. 4 is a schematic diagram depicting a place where the system for indicating locations within an area is applied according to one embodiment of the disclosure.

Reference is made to FIG. 4 which schematically depicts a building where a plurality of lighting apparatuses (401, 402, 403, 404, 405, and 406) are equipped according to one embodiment of the disclosure. In addition to associating to regions, the identifier of the apparatus can also associate to a floor where the lighting apparatus is installed.

The building shown in the diagram includes multiple floors, i.e., a first floor 41, a second floor 42 and a third floor 43. The area can be divided into multiple regions that include one or more regions on different floors. The area covering the floors is divided into the multiple regions where the plurality of lighting apparatuses 401, 402, 403, 404, 405 and 406 are installed respectively. Therefore, these regions can be indicated by different combinations of colors and patterns illuminated by the lighting units of the plurality of lighting apparatuses 401, 402, 403, 404, 405 and 406 separately.

In the system for indicating locations within an area, the plurality of lighting apparatuses 401, 402, 403, 404, 405 and 406 disposed at different locations on different floors constitute a mesh network. In the present example, the lighting apparatuses 401 and 402 are installed at two regions on the first floor 41, the lighting apparatuses 403 and 404 are installed at two regions on the second floor 42, and the lighting apparatus 405 and 406 are installed at two regions on the third floor 43. These lighting apparatuses 401 to 406 can be communicated over the mesh network and connected with a control center 40 directly or indirectly. The control center 40 records the identifiers with respect to the lighting apparatuses 401, 402, 403, 404, 405 and 406 for identifying the signals sent by any of the apparatuses.

For one further aspect of the disclosure, under the second mode, the control center 40 receives an identifier from one of the plurality of lighting apparatuses 401 to 406 over the mesh network, and the control center 40 is able to locate the lighting apparatus according to the identifier. Further, when the control center receives images taken by any of the lighting apparatuses 401 to 406 under the second mode, the control center can identify the location according to the color or the pattern shown in the images by querying a lookup table that records the color or the pattern associated with the identifier of the lighting apparatus. The lookup table may record the corresponding relationship of the colors, patterns, and/or floors with respect to the identifiers. For example, color 'red' corresponds to 'identifier_1', color 'red' and 'pattern 'A' correspond to 'identifier_2', pattern 'B' corresponds to 'identifier_3', and color 'blue', pattern 'C' and floor '3F' correspond to 'identifier_4'. In addition, the control center may already record the layout of the place installed with the plurality of lighting apparatuses.

In an exemplary example, when one of the regions in the building encounters power outage, the lighting apparatus located at the region is activated to illuminate a color or a pattern under a second mode. If there is a life trapped at the region, the life can send a simple message, an email, an instant message, a telephone call or the like including the color or the pattern illuminated by the lighting apparatus to the control center. The control center can identify the location where the life stays based on the color or the pattern informed by the life. In an emergency case, the control center can notify a rescuer a code indicative of the location including a region and a floor, and the rescuer can go to the location as instructed by the color or the pattern.

In an exemplary example, according to a coding rule, the code sent to the rescuer can be a combination of several digits. For example, the first three digits denote a color, the middle four digits denote a pattern, and the next three digits denote a floor. Therefore, the rescuer can decode the code according to the coding rule so as to recognize the location.

Figure 5:
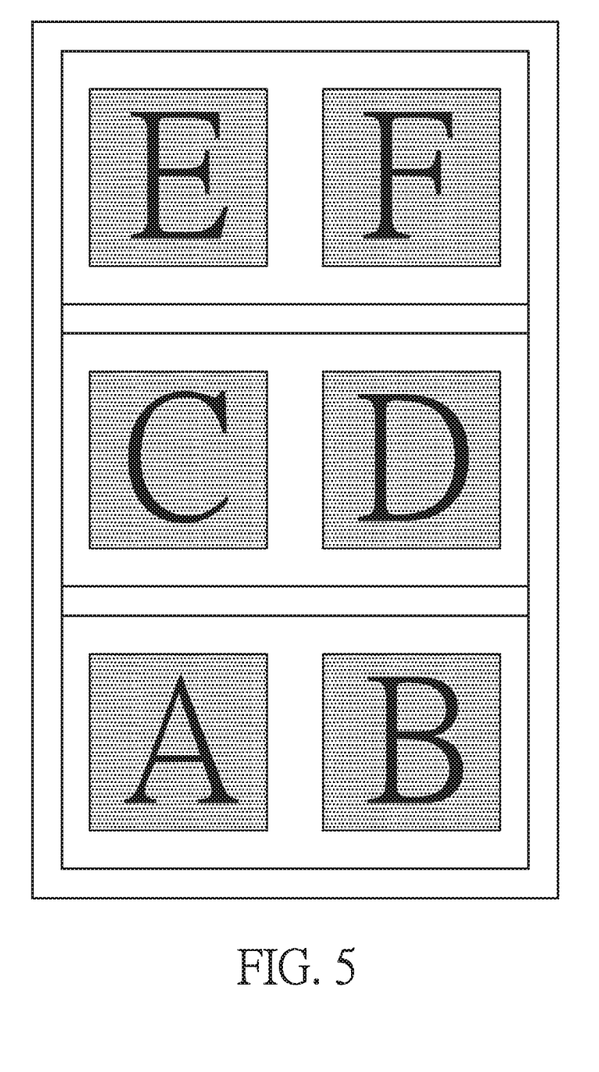
FIG. 5 shows a schematic diagram depicting patterns illuminated by a lighting unit of the lighting apparatus in one embodiment of the disclosure.

FIG. 5 is a schematic diagram depicting patterns (A', 'C', 'D', 'E', 'F') illuminated by the lighting apparatuses in one embodiment of the disclosure.

The present example shows that several lighting apparatuses are installed at different regions of a place and every lighting apparatus is assigned with a unique identifier and also a designated pattern, i.e., 'A', 'B', 'C', 'D', 'E' or 'F'. The lighting apparatuses are configured to illuminate different patterns 'A', 'B', 'C', 'D', 'E' and 'F' at different regions when the place suffers power outage.

In one embodiment of the disclosure, a lookup table is provided in the system for recording the patterns 'A', 'B', 'C', 'D', 'E' and 'F' indicative of the regions with region IDs and the corresponding lighting apparatuses with the identifiers. The lookup table can be used in the control center. Therefore, the control center or any life is able to recognize the region where a specific event occurs if acknowledging one of the patterns.

For example, the patterns 'A', 'B', 'C', 'D', 'E' and 'F' shown in the diagram are designated to several lighting apparatuses installed over the place. The patterns therefore can be recognized as the regions of the place. When a fire accident occurs to one of the regions, one of the lighting apparatuses is activated to illuminate the pattern 'C' onto a zone of the region in addition to turning on an emergency light. At the same time, the camera of the lighting apparatus can also be activated to capture images over the region, and the images are transferred to the control center via the mesh network. The control center can identify the region encountering the fire accident according to the pattern 'C' revealed in the images. On the other hand, if there is any life trapped in the region, the life can notify the control center the pattern 'C' which he sees in the region. The control center can therefore position the trapped life for the purpose of rescue.

Figure 6:
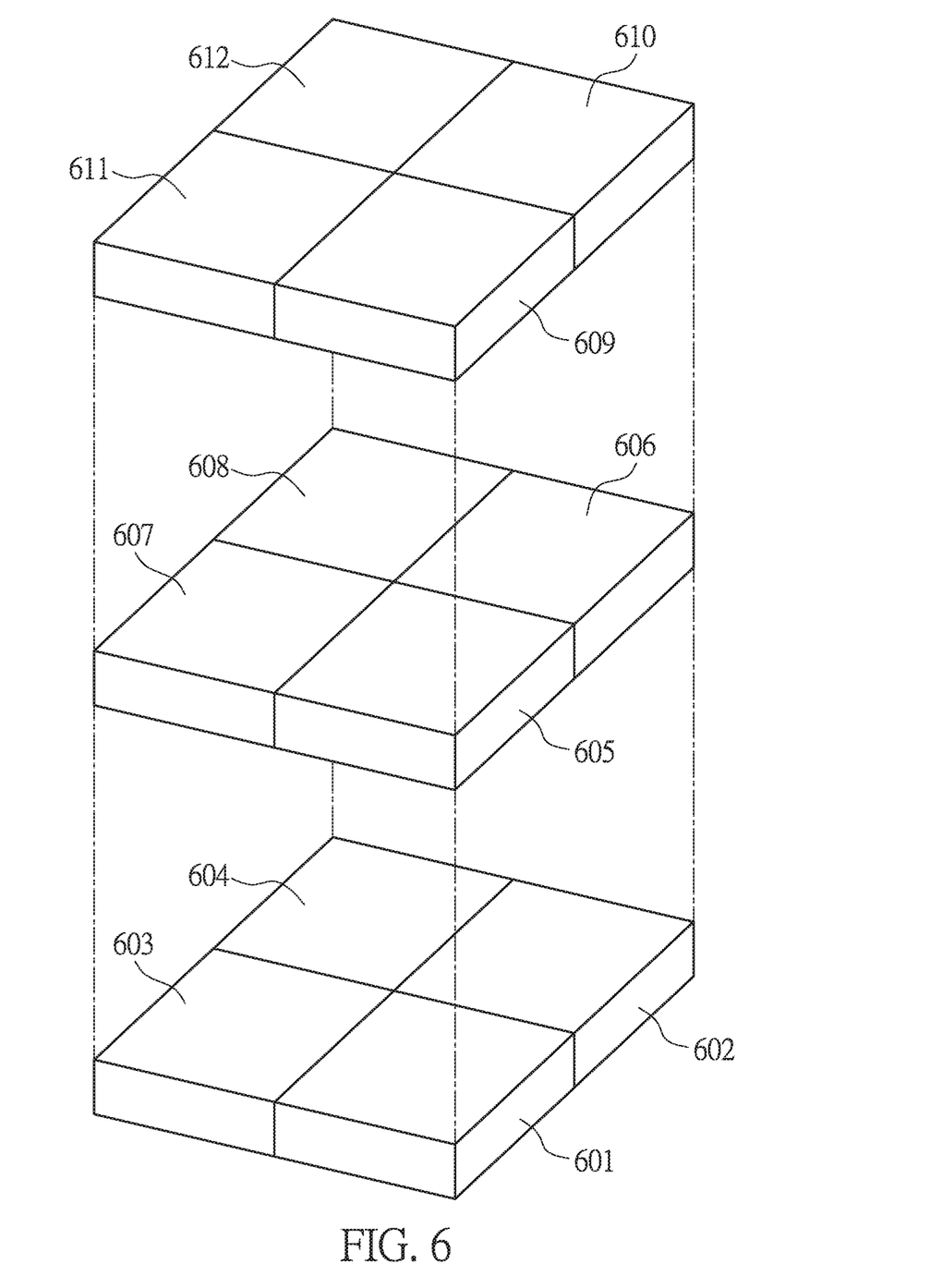
FIG. 6 shows another schematic diagram depicting colors or patterns illuminated on the regions on different floors in another embodiment of the disclosure.

Reference is next made to FIG. 6 which shows another schematic diagram depicting colors or patterns illuminated on the regions on different floors. A building with several floors is shown in the diagram. Three representative floors with regions 601, 602, 603, 604, 605, 606, 607, 608, 609, 610, 611 and 612 are used to describe the system for indicating locations within an area.

The building under surveillance is divided into the regions 601, 602, 603, 604, 605, 606, 607, 608, 609, 610, 611 and 612. The system sets up different colors or patterns for the regions 601, 602, 603, 604, 605, 606, 607, 608, 609, 610, 611 and 612 in advance. Accordingly, the lighting apparatuses disposed at these regions are also configured to illuminate the corresponding color, patterns and/or floor. When receiving identifier relating to one of the colors, patterns and/or floor, the control center or any life can rely on the colors, patterns and/or floor to identify the region associated with the received color, pattern and/or floor. On the other hand, the control center can notify the rescuer the color or the pattern and the rescuer can recognize the location, e.g. a region of a floor, accordingly.

For example, if a fire accident occurs to the region 608 and simultaneously suffers power outage, the lighting apparatus installed in the region 608 is switched to second mode when receiving a power-interruption signal. Under the second mode, the lighting apparatus of region 608 is activated to illuminate a designated color (or a pattern) over a certain range of the region 608. According to the present example, if there is any life trapped in the region, the life can return the color he sees to a control center even if the power goes out. Furthermore, the colors and/or the patterns illuminated by the lighting apparatus also allow the rescuer to report where he stays or the trapped lives are found to the control center. The control center can therefore determine the region 608 encounters the fire accident according to the message returned by the trapped life. Alternatively, the lighting apparatus is also activated to turn on its camera to capture images over the region 608 based on its angle of view, and the images can be transferred to the control center via the other lighting apparatuses in the mesh network. The control center can also determine that there is a trapped life in the region 608.

The control center can notify the rescuer the identifier of the lighting apparatus in the region 608 via the rescuer's portable device, and the rescuer can rely on the notification to reach the region 608 to rescue the trapped life. In this embodiment, the rescuer's portable device may store the lookup table having the relationship between colors, patterns and/or floors with respect to the different identifiers. Thus, the rescuer can understand where the trapped life is. In the meantime, the control center remotely controls the related lighting apparatuses (e.g., the lighting apparatuses in regions 605 to 607) to illuminate their designated colors over the regions respectively. Therefore, the control center then guides the rescuer to evacuate the trapped lives in the nearby regions (e.g., the regions 605 to 607) by sending an evacuation route marked by colors to the rescuer's portable device.

Figure 7:
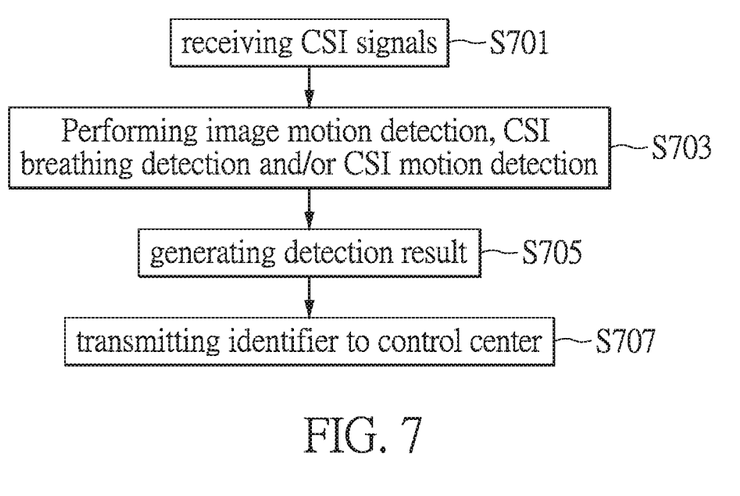
FIG. 7 shows another flow chart describing a process of CSI detection performed in the system in one embodiment of the disclosure.

According to one further embodiment of the disclosure, reference is made to FIG. 7 that shows another flow chart describing a process of CSI (channel state information) detection performed in the system. It should be noted that the CSI-related detection process is a kind of life detection that can be performed by the control center or one of the lighting apparatuses over the mesh network.

The present example indicates that the lighting apparatus performs the life detection, e.g., the CSI-related detection process is performed while receiving CSI signals from a device. In step S701, when one of the lighting apparatuses receives CSI signals from a transmitter device e.g., another lighting apparatus or a WiFi device with CSI capability. The lighting apparatus can individually perform life detection such as image motion detection, CSI breathing detection and/or CSI motion detection (step S703). It should be noted that the lighting apparatus may conduct an image motion detection, a CSI breathing detection or CSI motion detection by analyzing the CSI signals. The CSI signals collected in the lighting apparatuses can be used as a reference to detect the activity of lives through the technologies of the image motion detection, the CSI breathing detection and the CSI motion detection.

In step S705, after analyzing the CSI signals, a detection result is generated. In step S707, the lighting apparatus can transmit the detection result and the identifier of the apparatus to the control center for identifying the location of the trapped lives.

In one aspect of the disclosure, the lighting apparatus may be required by the control center to transmit the images captured by its camera to the control center based on the received identifier when any abnormal event is confirmed, or alternatively, the lighting apparatus may actively transmit the images to the control center if the detection result meets a specific condition. Still, the lighting apparatus may also be required to send the images when the personnel of the control center desire to reconfirm the status of the surveillance zone. Furthermore, the control center can remotely control the angle of view of the camera of the lighting apparatus when the personnel want to get more images from another angle of view of the lighting apparatus.

It should be noted that the abnormal event can be determined based on the detection result generated by any life detection, e.g., the image motion detection, the CSI breathing detection or CSI motion detection result, Furthermore, in one aspect of the disclosure, any of the plurality of lighting apparatuses in the mesh network can be in charge of performing the image motion detection, the CSI breathing detection or the CSI motion detection for the purpose of enhancement of efficiency of rescue.

In conclusion, the system for indicating locations within an area described in the above embodiments provides a solution that can clearly indicate locations and routes in a place where a plurality of lighting apparatuses are installed, especially in a special circumstance. For example, in case of emergency, the lighting apparatuses forming a mesh network in the place can guide rescue personnel to arrive some specific regions by illuminating colors or patterns on the regions. It should be noted that the system redefines the aspect of positioning since the colors or patterns illuminated by the lighting apparatuses are provided to indicate the locations where the lighting apparatuses are installed. For emergency case, not only the lighting apparatuses illuminate emergency lights, but also the rescue personnel can rely on the colors or patterns illuminated by the lighting apparatuses to reach specific regions and to evacuate the trapped lives.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:
1. A system for indicating locations within an area, comprising:
 a plurality of lighting apparatuses, which are installed at different locations within the area, forming a mesh network, and each of the plurality of lighting appara- tuses is assigned with an identifier that is used to locate the lighting apparatus with a color or a pattern;

wherein each of the plurality of lighting apparatuses comprises:

a control circuit used to operate the lighting apparatus with a first mode or a second mode;

a lighting unit, controlled by the control circuit, including a light source that is activated to illuminate the color or the pattern associated with the identifier of the lighting apparatus on a region for indicating where the lighting apparatus is located under the second mode; and a communication circuit, controlled by the control circuit, used to transmit signals generated by the control circuit or receive signals from another device over the mesh network, wherein the first mode is a normal mode that the lighting apparatus is standby and continuously charged, and the second mode is an emergency mode under which the lighting apparatus is activated, wherein the color or the pattern associated with the identifier and the corresponding lighting apparatus are recorded in a lookup table, which is queried for identifying a location of the region within the area under the emergency mode.

2. The system according to claim 1, wherein the area is divided into multiple regions that are indicated by different combinations of colors, patterns or floors illuminated by the lighting units of the plurality of lighting apparatuses separately.

3. The system according to claim 1, wherein the area is divided into multiple regions that are indicated by different combinations of colors and patterns illuminated by the lighting units of the plurality of lighting apparatuses separately.

4. The system according to claim 1, wherein the area is divided into multiple regions that are indicated by different combinations of colors, patterns and floors illuminated by the lighting units of the plurality of lighting apparatuses separately.

5. The system according to claim 1, further comprising a control center that receives the identifier from one of the plurality of lighting apparatuses over the mesh network under the second mode, and the control center is able to locate the lighting apparatus according to the identifier.

6. The system according to claim 1, wherein, when the lighting apparatus determines any abnormal event occurs, the identifier is sent to a control center.

7. The system according to claim 6, wherein the lighting apparatus performs life detection to determine whether the abnormal event occurs and in response to determining that the abnormal event occurs, the identifier is sent to the control center.

8. The system according to claim 7, wherein the life detection includes image motion detection, CSI breathing detection or CSI motion detection.

9. The system according to claim 8, wherein, in the lighting apparatus, the image motion detection is performed based on the series of images of the zone.

10. The system according to claim 6, wherein the control center is able to indicate the region by the color or the pattern when querying the lookup table that records the identifiers corresponding to the plurality of lighting apparatus.

11. The system according to claim 1, wherein the lighting apparatus is activated to illuminate the color or the pattern under the second mode when receiving an activation signal from a control center or a power-interruption signal.

12. A lighting apparatus, comprising:

a control circuit used to operate the lighting apparatus with a first mode or a second mode;

a memory unit recording an identifier that is used to locate the light apparatus with a color or a pattern;

a lighting unit, controlled by the control circuit, including a light source that is activated to illuminate the color or the pattern associated with the identifier of the lighting apparatus on a region for indicating where the lighting apparatus is located under the second mode; and a communication circuit, controlled by the control circuit, used to transmit signals generated by the control circuit or receive signals from another device over the mesh network, wherein the first mode is a normal mode that the lighting apparatus is standby and continuously charged, and the second mode is an emergency mode under which the lighting apparatus is activated, wherein the color or the pattern associated with the identifier and the corresponding lighting apparatus are recorded in a lookup table, which is queried for identifying a location of the region within the area under the emergency mode.

13. The lighting apparatus according to claim 12, wherein, when the lighting apparatus determines any abnormal event occurs, the identifier is sent to a control center.

14. The lighting apparatus according to claim 13, wherein the lighting apparatus performs life detection to determine whether the abnormal event occurs and in response to determining that the abnormal event occurs, the identifier is sent to the control center.

15. The lighting apparatus according to claim 14, wherein the life detection includes a motion detection, a CSI breathing detection or a CSI motion detection.

16. The lighting apparatus according to claim 13, wherein the control center is able to indicate the region by the color or the pattern when querying the lookup table that records the identifier corresponding to the lighting apparatus.

17. The lighting apparatus according to claim 13, wherein, in the lighting apparatus, the motion detection is performed based on the series of images of the zone.

18. The lighting apparatus according to claim 12, wherein the lighting apparatus is activated to illuminate the color or the pattern under the second mode when receiving an activation signal from a control center or a power-interruption signal.

* * * * *